(12) United States Patent
Garcia Guirado (10) Patent No.: US 10,942,904 B2
(45) Date of Patent: Mar. 9, 2021

(54) MAPPING FIRST IDENTIFIER TO SECOND IDENTIFIER

(71) Applicant: Arm Limited, Cambridge (GB)

(72) Inventor: Antonio Garcia Guirado, Trondheim (NO)

(73) Assignee: Arm Limited, Cambridge (GB)

( * ) Notice: Subject to any disclaimer, the term of this patent is extended or adjusted under 35 U.S.C. 154(b) by 218 days.

(21) Appl. No.: 16/155,030

(22) Filed: Oct. 9, 2018

(65) Prior Publication Data

US 2020/0110818 A1 Apr. 9, 2020

(51) Int. Cl.
*G06F 16/00* (2019.01)
*G06F 16/21* (2019.01)
*G06F 16/23* (2019.01)

(52) U.S. Cl.
CPC ........ *G06F 16/211* (2019.01); *G06F 16/2379* (2019.01)

(58) Field of Classification Search
CPC .... G06F 16/211; G06F 16/2379; G06F 16/23; G06F 16/25; G06F 16/00; G06F 12/0895; G06F 12/0877; G06F 2212/1028; G06F 2212/1056; G06F 17/30292; G06F 17/30377; G06F 17/30; G06F 16/9038; G06F 16/438; G06F 16/9535; G06F 17/3005; G06F 17/30867; G06F 17/30991; G06F 3/04842; G06F 3/0484; G06F 3/0148; G06F 3/0236; G06F 3/0418; G06F 3/0237; G06F 3/04886; G06T 1/20; G06T 1/60; G06T 15/005; G06G 16/258

See application file for complete search history.

(56) References Cited

U.S. PATENT DOCUMENTS

| | | | | |
|---|---|---|---|---|
| 9,379,980 | B1* | 6/2016 | Hedinger | G06F 13/00 |
| 2005/0209876 | A1* | 9/2005 | Kennis | G06Q 10/06311 |
| | | | | 726/1 |
| 2006/0124738 | A1* | 6/2006 | Wang | G06K 7/10079 |
| | | | | 235/385 |
| 2006/0212487 | A1* | 9/2006 | Kennis | G06Q 10/10 |
| 2008/0301256 | A1* | 12/2008 | McWilliams | G06F 12/0802 |
| | | | | 709/214 |
| 2009/0007199 | A1* | 1/2009 | La Joie | H04H 60/33 |
| | | | | 725/95 |
| 2013/0275686 | A1* | 10/2013 | Park | G06F 12/0831 |
| | | | | 711/146 |

(Continued)

*Primary Examiner* — Anh Ly
(74) *Attorney, Agent, or Firm* — Nixon & Vanderhye P.C.

(57) ABSTRACT

In a data processing system, mapping circuitry is provided to map one of J first identifiers received from an upstream component to one of K second identifiers to be provided to a downstream component (K<J). K mapping entries are each associated with a respective second identifier and each store mapping information for identifying which first identifier is mapped to the associated second identifier. For a first subset of mapping entries, allocation circuitry prevents allocation of a given first identifier to a mapping entry of the first subset other than a selected group of one or more mapping entries of the first subset selected based on the given first identifier. For a second subset of mapping entries associated with a second subset of the K second identifiers, the allocation circuitry permits the given first identifier to be allocated to any mapping entry in the second subset.

19 Claims, 6 Drawing Sheets

(56) References Cited

U.S. PATENT DOCUMENTS

| | | | |
|---|---|---|---|
| 2014/0068125 A1* | 3/2014 | Pullagoundapatti | ........................ G06F 13/1663 710/110 |
| 2016/0364333 A1* | 12/2016 | Brown | ................... G06F 12/084 |
| 2017/0257876 A1* | 9/2017 | Loehr | ................... H04W 72/10 |
| 2017/0308602 A1* | 10/2017 | Raghunathan | ......... G06F 16/273 |
| 2018/0203609 A1* | 7/2018 | Krueger | ................... G06F 9/467 |
| 2018/0203807 A1* | 7/2018 | Krueger | ................ G06F 12/126 |
| 2018/0239868 A1* | 8/2018 | Kopylov | ................. G16H 30/20 |
| 2018/0285145 A1* | 10/2018 | Acharya | .............. G06F 13/4282 |
| 2018/0286035 A1* | 10/2018 | Kozicki | ............... B42D 25/373 |
| 2019/0306173 A1* | 10/2019 | Reddy | ................... H04L 63/126 |

* cited by examiner

MAPPING FIRST IDENTIFIER TO SECOND IDENTIFIER

BACKGROUND

Technical Field

The present technique relates to the field of data processing.

Technical Background

There may be a number of points within a data processing system where an upstream component may use a first identifier to identify items such as requests, storage entries, graphics fragments to be processed, or any other item of interest to the data processing system, while a downstream component of the data processing system may use a second identifier to identify the items, where the correspondence between the first identifier used by the upstream component and the second identifier used by the downstream components may need to be tracked. The upstream components may use first identifiers which are selected from a set of J first identifiers and the downstream component may use second identifiers selected from a set of K second identifiers, where K is less than J. Mapping circuitry may be provided for allocating each first identifier to one of the K second identifiers and tracking the correspondence between the first and second identifiers so that on receipt of a second identifier from the downstream component it can be mapped back to the corresponding first identifier to be provided to the upstream component. However, this mapping circuitry may incur a certain amount of circuit area and may consume a certain amount of power. It may be desirable to reduce the amount of circuit area and power consumed by the mapping circuitry while providing a certain level of performance.

SUMMARY

At least some examples provide a data processing system comprising: mapping circuitry to map a received first identifier received from an upstream component of the data processing system to a corresponding second identifier to be provided to a downstream component of the data processing system, where the received first identifier is one of a set of J first identifiers and the corresponding second identifier is one of a set of K second identifiers, where K<J; the mapping circuitry comprising: K mapping entries each associated with a respective second identifier of the set of K second identifiers, and each configured to store mapping information for identifying which first identifier is mapped to the associated second identifier; and allocation circuitry to control allocation of first identifiers to the respective mapping entries of the mapping circuitry; in which: for a first subset of mapping entries associated with a first subset of the K second identifiers, the allocation circuitry is configured to prevent allocation of a given first identifier to a mapping entry of the first subset other than a selected group of mapping entries comprising one or more mapping entries of the first subset selected based on the given first identifier; and for a second subset of mapping entries associated with a second subset of the K second identifiers, the allocation circuitry is configured to permit the given first identifier to be allocated to any mapping entry in the second subset.

At least some examples provide mapping circuitry for a data processing system, for mapping a received first identifier received from an upstream component of the data processing system to a corresponding second identifier to be provided to a downstream component of the data processing system, where the received first identifier is one of a set of J first identifiers and the corresponding second identifier is one of a set of K second identifiers, where K<J; the mapping circuitry comprising: K mapping entries each associated with a respective second identifier of the set of K second identifiers, and each configured to store mapping information for identifying which first identifier is mapped to the associated second identifier; and allocation circuitry to control allocation of first identifiers to the respective mapping entries of the mapping circuitry; in which: for a first subset of mapping entries associated with a first subset of the K second identifiers, the allocation circuitry is configured to prevent allocation of a given first identifier to a mapping entry of the first subset other than a selected group comprising one or more mapping entries of the first subset selected based on the given first identifier; and for a second subset of mapping entries associated with a second subset of the K second identifiers, the allocation circuitry is configured to permit the given first identifier to be allocated to any mapping entry in the second subset.

At least some examples provide a method for mapping a received first identifier received from an upstream component of a data processing system to a corresponding second identifier to be provided to a downstream component of the data processing system, where the received first identifier is one of a set of J first identifiers and the corresponding second identifier is one of a set of K second identifiers, where K<J; the method comprising: in response to the received first identifier, allocating the received first identifier to one of K mapping entries each associated with a respective second identifier of the set of K second identifiers, each mapping entry configured to store mapping information for identifying which first identifier is mapped to the associated second identifier; in which: allocation of first identifiers to the respective mapping entries is controlled such that: for a first subset of mapping entries associated with a first subset of the K second identifiers, a given first identifier is prevented from being allocated to a mapping entry of the first subset other than a selected group comprising one or more mapping entries of the first subset selected based on the given first identifier; and for a second subset of mapping entries associated with a second subset of the K second identifiers, the given first identifier is permitted to be allocated to any mapping entry in the second subset.

Further aspects, features and advantages of the present technique will be apparent from the following description of examples, which is to be read in conjunction with the accompanying drawings.

DESCRIPTION OF EXAMPLES

A data processing system may have mapping circuitry to map a received first identifier received from an upstream component of the data processing system to a corresponding second identifier to be provided to a downstream component of the data processing system, where the received first identifier is one of a set of J first identifiers and the corresponding second identifier is one of a set of K second identifiers, and K is less than J. The mapping circuitry may have K mapping entries each associated with a respective second identifier of the set of K second identifiers, and each configured to store mapping information for identifying which first identifier is mapped to the associated second identifier. The mapping circuitry may also comprise allocation circuitry to control allocation of first identifiers to the respective mapping entries of the mapping circuitry.

Hence, when a first identifier is received from the upstream component, the allocation circuitry may select one of the mapping entries of the mapping circuitry based on an allocation policy, store mapping information in the allocated mapping entry which identifies which first identifier is mapped to the associated second identifier, and provide the second identifier which is associated with the selected mapping entry to the downstream component. The mapping information stored in the mapping entry may be used on receipt of a response from the downstream component to reverse map the second identifier back to the corresponding first identifier.

The allocation circuitry could use a number of different allocation policies to control which mapping entries are selected for allocating the first identifier. One possible approach could be that for any first identifier, the allocation circuitry is allowed to select any of the K mapping entries as the mapping entry to which the received first identifier is to be allocated. However, this approach can be expensive in terms of area and power consumption because the mapping information stored in each mapping entry may need to comprise a larger number of bits to identify which first identifier is mapped to the associated second identifier.

Another alternative approach could be that for any given first identifier, that first identifier is only allowed to be allocated to a certain sub-group of mapping entries and is not allowed to be allocated to any other mapping entry. For example a hash of the first identifier may be generated and the resulting hash value may be used to select the particular mapping entry to which the first identifier is to be allocated. This allows fewer bits to be stored as mapping information. However, with this approach if the mapping entry selected based on the hash is already in use for another first identifier, then it is not possible to allocate the received first identifier to any mapping entry, and this may stall the upstream component preventing it from issuing further requests until the mapping entry corresponding to the hash of the first identifier becomes available. Hence, while this approach may be cheaper in terms of circuit area and power, it may be impractical because the upstream component may stall even if only a few second identifiers are in use, due to aliasing of the first identifiers onto the mapping entries.

With the approach discussed below, the K mapping entries of the mapping circuitry are divided into a first subset and a second subset, the first subset of mapping entries being associated with a first subset of the K second identifiers and the second subset of mapping entries being associated with a second subset of the K second identifiers. For the first subset of mapping entries, the allocation circuitry may prevent allocation of a given first identifier to a mapping entry of the first subset other than a selected group of mapping entries which comprise one or more mapping entries of the first subset selected based on the given first identifier. In contrast, for the second subset of mapping entries, the allocation circuitry may permit the given first identifier to be allocated to any mapping entry in the second subset.

Hence, this approach can provide a much better balance between performance and circuit area and power overheads. By restricting which of the first subset of mapping entries are allowed to be allocated with a given first identifier, this means that the amount of mapping information needed for each of the first subset of mapping entries can be reduced, but by also providing a second subset of mapping entries for which there is no restriction on which of the second subset of mapping entries can be allocated with a particular first identifier, this provides a "spill set" of entries which can accommodate those first identifiers which could not be allocated into the first subset of mapping entries due to aliasing with a different first identifier allocated to the same mapping entry of the first subset, which improves performance.

In other words, the provision of the second subset of entries means that most of the second identifiers can be used in parallel in practice, because there would need to be as many aliasing conflicts as there are mapping entries in the second subset before the upstream component is stalled due to lack of mapping entries. This means that this scheme provides a similar level of performance to a fully dynamic allocation of first identifiers to the mapping entries, capturing the performance benefits of this scheme. Nevertheless, for the mapping entries in the first subset, the area requirements per entry are low, enabling a great reduction in the overall circuit overhead for the mapping circuitry.

The allocation circuitry may control allocation of the first identifiers to the respective mapping entries so that a received first identifier may preferentially be allocated to one of the first subset of mapping entries, with a second subset of mapping entries being used if it is not possible to allocate the received first identifier to one of the first subset of mapping entries. By prioritising use of the first subset of mapping entries (if possible) for the received first identifier, this preserves the second subset of mapping entries for those cases where there is an aliasing between a previously allocated first identifier and the received first identifier, which will tend to improve performance.

Hence, when the received first identifier is one a first group of first identifiers, the allocation circuitry may allocate the received first identifier to one of the selected group of mapping entries of the first subset selected based on the received first identifier, when one of the selected group of mapping entries is available. However, when none of the selected group of mapping entries of the first subset are available then the received first identifier may be allocated to one of the second subset of mapping entries. This tends to make more efficient use of the mapping entries.

In some examples, the first group of first identifiers may comprise the entire set of J first identifiers. In this case, for any received first identifier the allocation circuitry may first check whether any of the selected group of mapping entries for that first identifier is available and if so allocate it to one of the available entries in the selected group of mapping entries, but if none of the selected group of entries is available then the received first identifier may be allocated to one of the second subset of mapping entries if available.

However, for other implementations the first group of first identifiers may comprise fewer than J first identifiers. In this case there may also be a remaining group of first identifiers. When the received first identifier is one of the remaining group of first identifiers, the allocation circuitry may allocate the received first identifier to one of the second subset of mapping entries, regardless of whether any mapping entries in the first subset are available. This could be useful for example, if the relative numbers J and K of first and second identifiers are not friendly for generating a good hash function, in which case it may be preferred to apply the hash function for selecting the first subset of mapping entries to fewer than J of the first identifiers with remaining first identifiers being allocated directly to the second subset of mapping entries without being subject to the hash. For example, this approach may be useful if one or both of the numbers J and K is not an exact power of 2.

Regardless of whether the allocation scheme discussed above (of prioritising allocation to the first subset of mapping entries over the second subset) is applied to the entire set of J first identifiers or to a reduced group of fewer than J first identifiers, in cases when the received first identifier is one of the first group of identifiers and none of the selected group of mapping entries of the first subset are available, and also none of the second subset of mapping entries are available, the allocation circuitry may trigger stalling of the upstream component. In this scenario, it is not possible to allocate the received first identifier to any of the mapping entries. Similarly, for the remaining group of first identifiers, if none of the second subset of mapping entries are available then the upstream component may be stalled. When the upstream component is stalled, the upstream component may be prevented from making further requests which require mapping of a first identifier to a second identifier. Even when the upstream component is stalled, it may still be able to carry out other tasks (e.g. unrelated computations) which do not require a request to be issued to the downstream component which would require mapping of a first identifier to a second identifier.

The mapping information stored in each mapping entry may be different for the second subset of mapping entries compared to the first subset. For a mapping entry of the second subset, the mapping entry may specify the entire value of the first identifier which is mapped to the associated second identifier.

In contrast, for a mapping entry of the first subset, the mapping information may specify a tag value with fewer bits than the first identifier which is mapped to the associated second identifier. This tag value can be represented with fewer bits than the first identifier because the tag value of a given mapping entry of the first subset merely needs to provide information for distinguishing the first identifier which is mapped to the associated second identifier from other first identifiers which are allowed to be allocated to that given mapping entry of the first subset by the allocation circuitry, and does not need to distinguish that first identifier from all other first identifiers. By providing reduced size tag values as the mapping information for each mapping entry at the first subset, this reduces the circuit area overhead of the mapping circuitry.

In some examples the selected group of mapping entries of the first subset, to which a given first identifier is allowed to be allocated, may comprise a single mapping entry of the first subset selected based on the hash function of the given first identifier. Hence in this example each first identifier is only allowed to be allocated to a single one of the mapping entries of the first subset, or to any of the entries of the second subset. The hash function used to identify the single mapping entry corresponding to the given first identifier could for example comprise simply extracting a subset of bits from the given first identifier (e.g. the least significant portion of the bits of the given first identifier) or could be a hash function such as adding or subtracting a constant to or from the given first identifier, or combining the given first identifier with a constant using an exclusive or (XOR) operation. In general the hash function may be a reversible hash function for which a corresponding inverse hash function applied to a second identifier may, together with the mapping information stored in a given mapping entry, enable the corresponding first identifier to be reconstructed.

In other examples, the selected group of mapping entries of the first subset may comprise two or more mapping entries of the first subset. This gives more opportunity for one of the selected group to be available so that one of the first subset of entries can be allocated for the received first identifier if possible. This may improve performance because it reduces the number of aliasing conflicts when no mapping entry in the first subset is available for allocation to the received first identifier, and hence the frequency with which it is needed to use one of the second substantive entries. This means that the number of entries in the second subset of entries required to achieve a given amount of performance may be reduced, enabling lower circuit area.

In one example, each of the two or more mapping entries to which the given first identifier can be allocated may be selected based on a respective hash function of the given first identifier. Hence a number of different hash functions may be applied to the same received first identifier to identify two or more mapping entries in the selected group.

If multiple hash functions are applied to the given first identifier and the selected group of mapping entries comprises two or more mapping entries, then the mapping information for a given mapping entry of the first subset may, in addition to the tag value, also specify information indicative of which of a plurality of hash functions was used to allocate the associated first identifier to the given mapping entry. This allows reverse mapping circuitry to apply the correct hash function to the received second identifier in order to reconstruct the corresponding first identifier.

Reverse mapping circuitry may be provided to map a received second identifier received from the downstream component to a corresponding first identifier to be provided to the upstream component, based on the mapping information stored in a selected mapping entry of the first subset or the second subset, where the selected mapping entry is selected based on the received second identifier.

Following receipt of the received second identifier from the downstream component, the mapping circuitry may make the selected mapping entry available for reallocation to a different first identifier. Hence, when a given mapping entry is allocated to a particular first identifier, it may become unavailable until the corresponding response specifying the associated second identifier is received from the downstream component and then that mapping entry can be made available for reallocation to a different first identifier.

The mapping circuitry can be used in a wide variety of scenarios within a data processing system.

In one example the upstream component may comprise a cache, and the downstream component may comprise a memory system component. For example the received first identifier may comprise a cache line identifier identifying a cache line of the cache, and the second identifier may comprise a memory transaction identifier associated with a memory transaction to be issued to the memory system component.

This can be useful, for example, when issuing cache linefill requests to obtain data from the memory system and allocate the data into a particular cache line of a cache. The cache may issue a linefill request which specifies the cache line identifier of the particular cache line to which the data is to be stored. However the cache may comprise a larger number of cache lines than the number of memory transactions which the cache is allowed to initiate at a given time or which the memory system can handle, and so to avoid unnecessarily carrying extra bits across the buses of the memory system, the cache line identifier may be mapped to one of a smaller set of memory transaction identifiers, which can then be represented using fewer bits. When the memory system component provides a response to the memory transaction, returning the data in response to the linefill request, the memory transaction identifier (second identifier) can be reverse mapped back to the corresponding cache line identifier (first identifier). The mapping circuitry can be used to provide a more efficient scheme for generating the transaction identifiers of the memory transactions on cache misses.

In another example, the upstream component may comprise a master device of the data processing system and the downstream component may comprise a slave device. For example, the master device may be arranged to issue requests to two or more respective slave devices, and each slave device may comprise a respective instance of the mapping circuitry to map the received first identifier specified by the master device to the corresponding second identifier used by the slave device.

For example a system may include a master device which communicates with many slaves and while the master may identify its many internal transactions with a large identifier, which may be needed to be large enough that it can cover the transactions being issued to all of the slaves, each individual slave may not need to handle as many transactions simultaneously and so could use smaller identifiers internally. For example the total number J of the first identifiers used by the master device could be the sum of the individual numbers of identifiers used by each of the slaves, or could be even more than the sum of the numbers of slave identifiers so that there are sufficient master identifiers to be able to keep all of the slave devices busy concurrently. Hence, each slave device could use mapping circuitry of the form discussed above to perform the mapping between the set of J master identifiers (first identifiers) and the set of K internal slave identifiers (second identifiers) which are used by that particular slave device. With this approach the master device can simply use its transaction identifier when issuing requests to any of the slaves, and the identifier mapping takes place transparently for both the master and slave devices.

In another example the mapping circuitry could be used within a graphics processor. For example the downstream component could comprise texture mapping circuitry of graphics processing circuitry, where the received first identifier comprises a message identifier issued by an upstream component of the graphics processing circuitry to trigger the texture mapping circuitry to perform texture mapping on a corresponding graphics fragment (e.g. a triangle or quad), and the corresponding second identifier may comprise a fragment identifier used by the texture mapping circuitry to identify the corresponding graphics fragment. This can be useful, for example, because the texture mapping circuitry may only need to provide sufficient fragment identifiers that it can distinguish the different graphics fragments currently being processed by the texture mapping circuitry, whereas an upstream component of the graphics processing circuitry may need to take a more global view of fragments to be processed or other items identified by the corresponding message identifiers. Hence, the mapping circuitry of the form discussed above can reduce the area overhead of the mapping circuitry for converting between the message identifiers and the graphics fragment identifiers.

It will be appreciated that these are just some examples of potential scenarios in which the mapping circuitry can be used, and the same mapping circuitry could also be used for other situations in which an upstream component of the data processing system generates first identifiers which are to be mapped to second identifiers used by a downstream component where the number of second identifiers available is less than the number of first identifiers.

Figure 1:
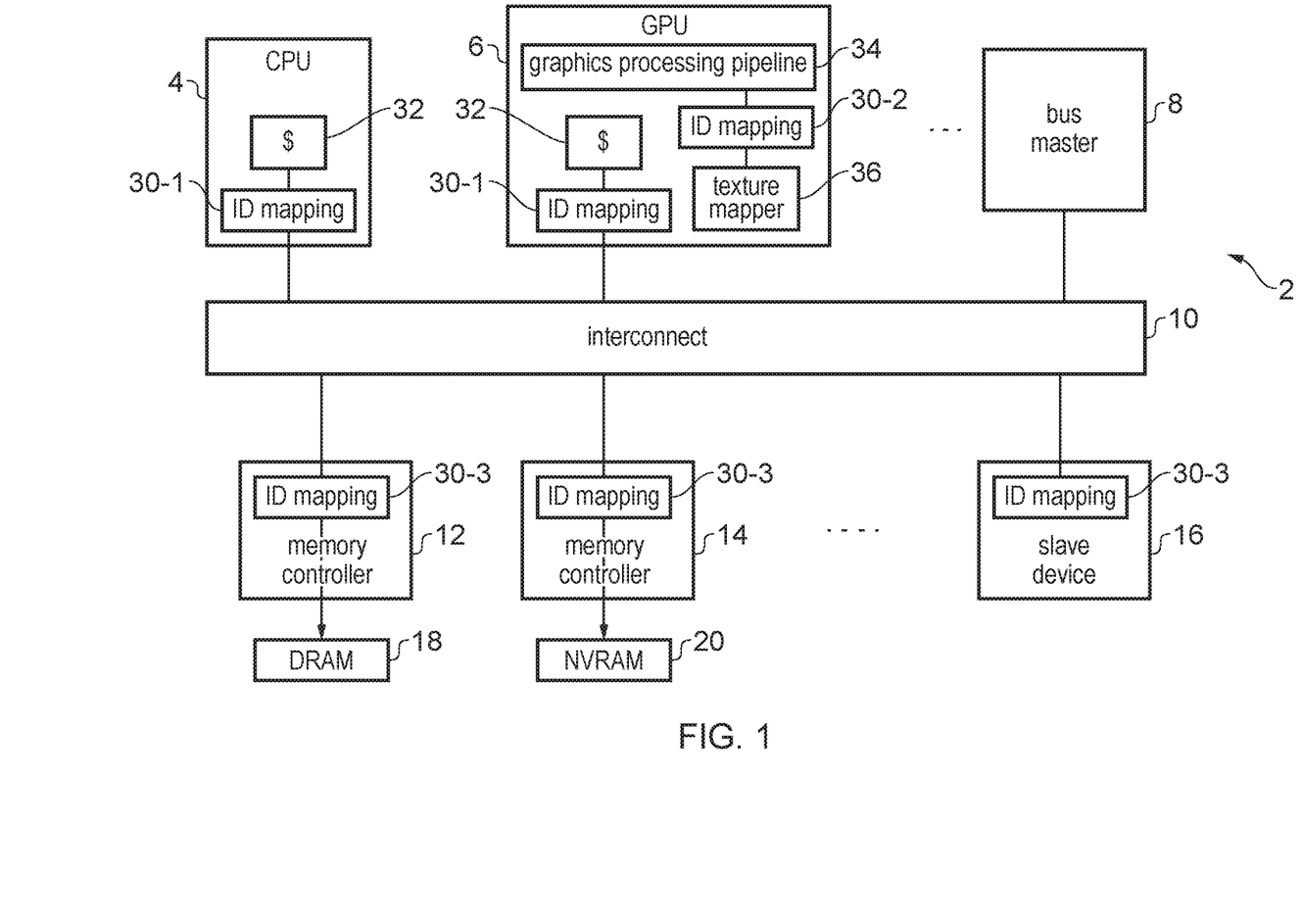
FIG. 1 schematically illustrates an example of a data processing system having mapping circuitry for mapping a first identifier to a second identifier.

FIG. 1 schematically illustrates an example of a data processing system 2. In this example the data processing system includes a number of master devices including a central processing unit (CPU) 4, a graphics processing unit (GPU) 6, and one or more other bus master devices 8, such as display controllers, network interface controllers, etc. The master devices 4, 6, 8 are coupled by an interconnect 10. The master devices issue transactions which are serviced by a number of slave devices 12, 14, 16. For example the slave devices may include memory controllers 12, 14 for respective memory devices such as a DRAM (dynamic random access memory) 18 or non-volatile RAM (NVRAM) 20. Other types of slave devices 16 could include for example peripheral controllers for controlling access to peripheral devices or cryptographic units for performing cryptographic operations on request by a master device.

It will be appreciated that FIG. 1 is just one particular example of a possible data processing system and other systems may have different sets of components.

At a number of points of the data processing system, identifier mapping circuitry 30 may be provided for mapping a first identifier provided by an upstream component of the data processing system 2 to a second identifier used by a downstream component of the data processing system 2. The first and second identifiers may be used to identify some associated information (such as memory addresses, data, or other information) which is being passed between an upstream component and a downstream component. The associated information may pass through the mapping circuitry 30 unchanged (or may bypass the mapping circuitry 30), while the identifiers are being remapped.

For example, the CPU 4 may have a cache 32 for caching data from the memory system 18, 20 and identifier mapping circuitry 30-1 may be provided for mapping cache line identifiers used for linefill requests issued by the cache 32 to request data from the memory system to corresponding memory transaction identifiers which are used on the interconnect 10 and within the memory system components 12, 14, 16 to identify corresponding read transactions. The cache may have a greater number of cache lines than the number of memory transactions that can be supported at one time in the memory system and so a larger set of cache line identifiers may be mapped to a smaller set of transaction identifiers by the identifier mapping circuitry 30-1. Similarly, the GPU 6 may also have a cache 32 and corresponding identifier mapping circuitry 30-1 for mapping the cache line identifiers to the transaction identifiers and vice versa. Hence, for mapping circuitry 30-1 the upstream component may be the cache 32 and the downstream component may be a memory system component 10, 12, 14, 18 or 20. For mapping circuitry 30-1, the linefill requests from the upstream cache may specify a memory address which passes the mapping circuitry 30-1 unchanged while the cache line identifier is mapped to a transaction identifier by the identifier mapping circuitry 30-1. When a data response is received from memory, the data passes the mapping circuitry 30-1 unchanged while the transaction identifier is mapped back to a cache line identifier.

Another point of the system where identifier mapping circuitry may be provided may be in the GPU 6, where a graphics processing pipeline 34 may request that a texture mapper 36 performs texture mapping operations for certain graphics fragments (e.g. quads or triangles) to provide a rendered texture pattern within the boundary of that fragment. The graphics processing pipeline 34 may use message identifiers to track the different parts of the image being rendered and may issue messages to the texture mapping circuitry 36 specifying the message identifier for the particular graphics operations required. However the texture mapper may only support a certain number of texture mapping operations at a time and so to reduce the size of the identifiers distinguishing each texture mapping operation, a smaller set of quad identifiers may be used by the texture mapper 36 compared to the set of message identifiers available in the graphics processing pipeline 34. Therefore, identifier mapping circuitry 30-2 may be provided to map the message identifiers to the fragment identifiers and vice versa. For the identifier mapping circuitry 30-2, the upstream component may therefore be the graphics processing pipeline 34 and the downstream component may be the texture mapper 36.

Another point at which identifier mapping may be performed may be within the respective slave devices 12, 14, 16, which may each be provided with identifier mapping circuitry 30-3 for mapping a master transaction identifier issued by a given master device 4, 6, 8 to a smaller slave transaction identifier used by that particular slave device 12, 14 or 16. For example the CPU 4 could generate relatively large transaction identifiers which need to distinguish all the transactions issued by the CPU 4 at a given time from each other, regardless of which slave handles those transactions. However, an individual slave device it may only be able to handle fewer transactions simultaneously, and so does not need as long an identifier to distinguish its transactions. Therefore the identifier mapping circuitry 30-3 at an individual slave may map the larger set of master transaction identifiers to a smaller set of slave transaction identifiers to reduce the number of bits that need to be carried along buses used to communicate the transaction with downstream components. Hence, with this example the upstream component for the identifier mapping circuitry 30-3 may be one of the master devices 4, 6, 8 while the downstream component may be one of the slave devices 12, 14, 16 or a downstream memory system component such as the memory units 18 or 20.

It will be appreciated that a given instance of a data processing system 2 need not have all of the different examples of the mapping circuitry 30-1, 30-2, 30-3 shown in FIG. 1. Some systems may only have one of these types of mapping circuitry or could have two or more. Also, it will be appreciated that these examples of mapping circuitry 30 are just some scenarios in which it could be useful to map one type of identifier to another, and similar mapping circuitry may be used for other identifier mapping scenarios as well.

Figure 2:
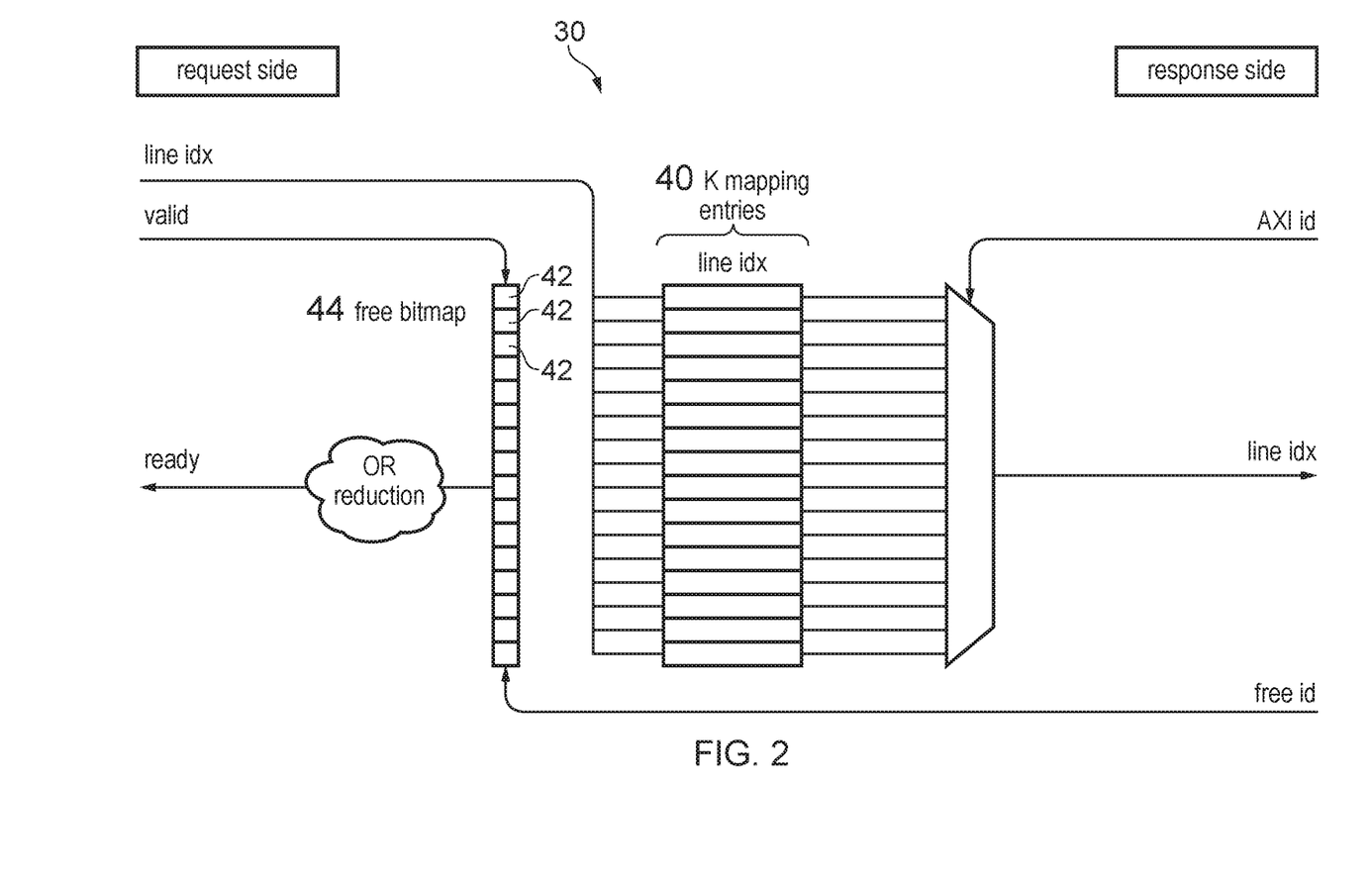
FIGS. 2 and 3 show for comparison two alternative approaches for implementing the mapping circuitry.
Figure 3:
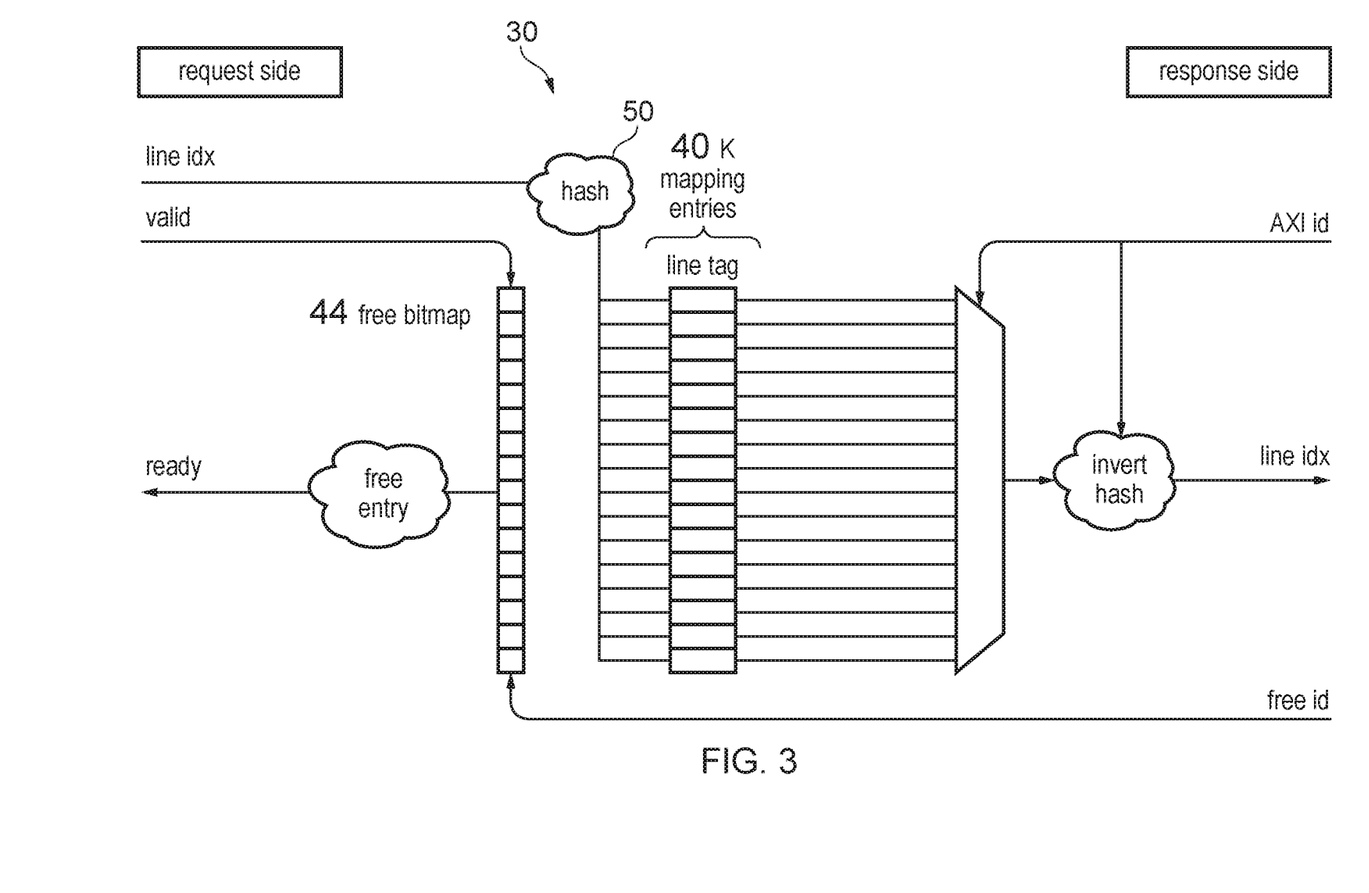

The mapping circuitry 30 will be described in more detail with respect to FIG. 4 below. However, first two alternative ways of implementing the mapping circuitry are shown in FIGS. 2 and 3. It will be appreciated that the drawings illustrate the mapping of the identifiers, but do not show the related information associated with the identifiers (such as memory addresses or data), that is being transmitted between the upstream and downstream components, and which passes through unchanged regardless of the remapping of the identifiers.

As shown in FIG. 2, one way to implement the mapping circuitry may be to provide a number K of mapping entries 40, where K is the number of second identifiers used by the downstream component, and K is less than the number (J) of first identifiers available for use by the upstream component. In the examples of FIGS. 2 to 4, for ease of explanation it is assumed that this mapping circuitry is used in the scenario 30-1 where a cache line identifier (line idx) is the first identifier received from the cache 32 as the upstream component, and a transaction identifier (AXI id) is used as the second identifier to be provided to the memory system as the downstream component. It will be appreciated that the same mapping circuitry could be used in any of the other scenarios 30-2 or 30-3 shown in FIG. 1.

In the example of FIG. 2, each of the mapping entries 40 is associated with a corresponding one of the memory transaction identifiers (second identifiers) and stores mapping information which specifies the cache line ID (first identifier) which is mapped to the associated second identifier. Also each mapping entry has a corresponding available bit 42 specified in a free bitmap 44, where the available bit 42 indicates whether the corresponding mapping entry 40 is unavailable (as it is currently being used to map a line ID to a transaction ID for a request which has been issued to the downstream memory components but for which no response has yet been received), or is available for reallocating to a different first identifier.

With the approach shown in FIG. 2, each time there is a cache miss in the cache 32, a linefill request is issued specifying a cache line identifier, and the mapping circuitry 30-1 checks the available bitmap 44 and selects one of the mapping entries 40 for which the corresponding available bit 42 indicates that the mapping entry is available. For the scheme shown in FIG. 2, a fully-associative mapping is used, and so any available mapping entry 40 can be selected for each particular cache line identifier. If all of the mapping entries 40 are already in use then there are no available transaction IDs and so the new request is stalled, which will stall the operation of the cache 32 upstream (and hence may slow down the CPU 4 or GPU 6 associated with that cache). However this stalling may not happen often, because to stall the upstream component this would imply that all of the mapping entries 40 must be taken, which may not happen often.

For each transaction ID (second identifier) in use, the corresponding mapping entry stores the cache line identifier (first identifier) mapped to that transaction identifier, so that the mapping circuitry knows where in the cache to store the requested data when it is returned from the memory system. Hence, each mapping entry 40 would store one cache line ID per transaction ID. The full cache line ID has to be stored in each mapping entry 40 because of the fully-associative allocation policy which means that any cache line ID can be allocated to any mapping entry 40.

This approach may be good for performance because as long as there are free mapping entries then the cache linefill request can be forwarded to the downstream memory system component, as any available entry can be used. Also when a response is returned from the memory system, then the corresponding mapping entry 40 can be selected based on the received transaction identifier, and then the cache line ID stored as mapping information in the corresponding mapping entry 40 is used to identify the correct cache line to allocate the returned data to. However, this approach is expensive in area, because for every mapping entry 40 the full cache line identifier needs to be stored.

FIG. 3 shows a second alternative approach which may be more efficient in area and power consumption. For this approach, when the linefill request is received specifying a cache line identifier, a hash function 50 is used to generate an index of one particular mapping entry 40 and the mapping circuitry checks whether the selected entry identified by the hash 50 of the cache line ID is available using the free bitmap 44. If the selected mapping entry 40 is available, then that entry is allocated with the received cache line identifier, and the request is forwarded downstream specifying the associated transaction identifier which is associated with the selected mapping entry 40. A tag value with fewer bits than the full cache line identifier is stored in the selected mapping entry 40 as mapping information, which provides some bits to distinguish between all of the cache line identifiers for which the hash function aliases to the same mapping entry 40. For example if each mapping entry 40 can be accessed by two different cache line identifiers, then the tag stored in the mapping entry 40 may comprise one bit. If there are more than two cache lines which could contend for the same mapping entry, then more than one bit of tag information may need to be stored. As the tag is much shorter than the overall cache line identifier, this scheme is much cheaper in terms of circuit area and power consumption. However, this scheme may be impractical in terms of performance because even if most of the mapping entries 40 are available, if for the current received line identifier the selected mapping entry 40 which is identified based on the hash 50 is already in use, this may stall the request even though only a few transaction identifiers are in use. This can be harmful to performance.

Figure 4:
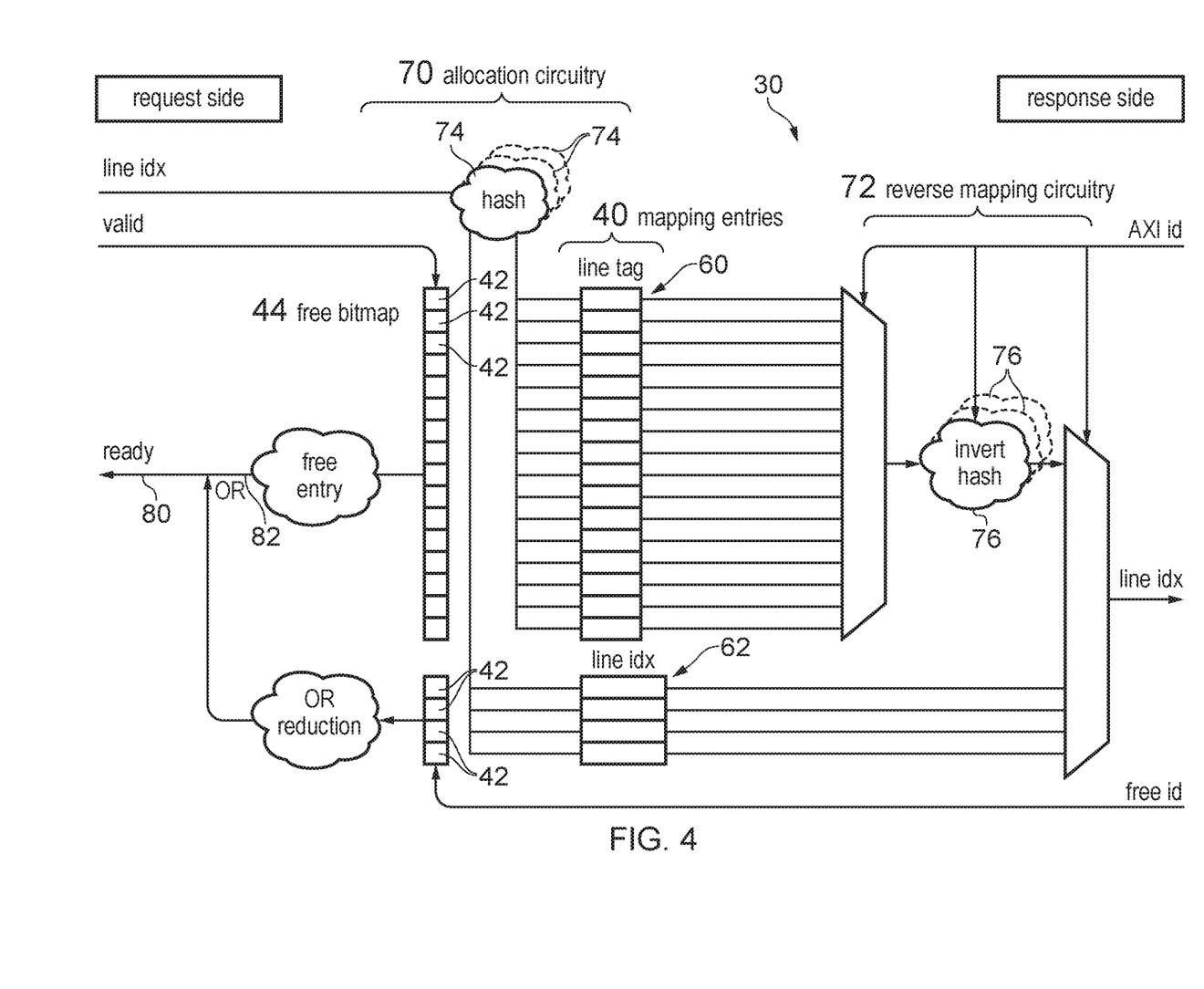
FIG. 4 shows mapping circuitry according to the present technique, in which the mapping circuitry includes a first subset of mapping entries and a second subset of mapping entries.

FIG. 4 shows an example of the mapping circuitry 30 shown in FIG. 1. Again for conciseness it will be described with reference to the example 30-1 where the first identifier is the cache line identifier and the second identifier is the transaction identifier, but the same circuitry could be used for any of the other mapping scenarios 30-2 or 30-3.

The mapping circuitry comprises allocation circuitry 70 which controls allocation of the first identifier to a particular one of the mapping entries 40 and reverse mapping circuitry 72 for controlling the reverse mapping of a transaction identifier received from the downstream component back to the cache line identifier used by the upstream component.

In this example the mapping entries 40 are divided into a first subset 60 for which each cache line identifier is only allowed to be allocated to a certain group of mapping entries 40 of the first subset 60 and is not allowed to be allocated to the mapping entries of the first subset other than that selected group, and a second subset 62 for which there is a free allocation of any cache line identifier into any mapping entry 40 of the second subset 62. For the mapping entries in the first subset 60, the reduced size line tag is stored as mapping information similar to the example of FIG. 3, while for the second subset 62, each mapping entry 40 specifies as the mapping information the full cache line identifier similar to the example of FIG. 2. For example, a fully-associative allocation policy is used for the second subset 62, but a direct-mapped, hash-associative or set-associative policy is used for the first subset 60. With a hash-associative policy, multiple different hash functions may be applied to the received cache line identifier with the result of each hash identifying one of a set of entries of the first subset to which that cache line identifier can be allocated. In contrast, with a set-associative policy, a single hash function is used to map the received cache line identifier to an identifier of a whole group of entries of the first subset, any of which can be used. For instance, in a set-associative policy, hash value 0 could map to entries 0, 1, 2 and 3; hash value 1 could map to entries 4, 5, 6 and 7, etc.

An available bitmap is provided with a number of bits 42 each specifying whether a corresponding mapping entry 40 is available or unavailable. In some examples if the available bit 42 is 1 then this may indicate that the mapping entry 40 is unavailable and if the available bit 42 is 0 then this may indicate that the mapping entry is available, while other approaches may use the opposite mapping between 0 and 1 and the available/unavailable status.

Hence, with this approach when a request is received from the upstream component (e.g. cache 32) the allocation circuitry 70 first tries to allocate the cache line identifier to one of the first subset of entries 60 identified by applying a hash function 74 to the received cache line identifier. For example the hash function could simply select a subset of bits of the cache line identifier, or could apply a more complex transformation such as adding or subtracting a constant to or from a selected set of bits of the cache line identifier, or XORing the selected bits with a constant. If the free bitmap 44 indicates that the selected mapping entry 40 identified by the hash 74 is available then that entry is allocated with the received first line identifier and the line tag associated with that cache line identifier is stored as the mapping information in the mapping entry 40, and the request is forwarded downstream specifying the particular transaction identifier which was associated with the selected entry.

On the other hand, if the mapping entry of the first subset 60 selected using the hash 74 is not available then if there is an available mapping entry in the second subset 62 then the received cache line identifier is allocated to one of the second subset of entries and again the second identifier (transactional identifier) associated with that allocated entry is forwarded downstream to the downstream component. Hence the second subset of entries acts as a spill set for dealing with cases where there is an aliasing conflict between the received cache line identifier and a previously allocated cache line identifier in the first subset 60. This helps to improve performance without needing to incur the full cost of specifying the full line identifier as mapping information for all of the mapping entries 40.

The partitioning between the first and second subset 60, 62 may be static. Hence, for each particular transaction identifier it is predetermined whether this corresponds to the first subset 60 or the second subset 62. This means that when a response is received from the downstream component identifying a particular transaction identifier (second identifier), the reverse mapping circuitry 72 can simply index into the corresponding one of the mapping entries 40 (which could be in either the first subset 60 or the second subset 62) based on the received transaction identifier. If the selected mapping entry 40 is in the second subset 62 then the cache line identifier is read from the mapping information specified in that mapping entry and this is returned to the upstream component. If the selected entry is in the first subset 60 then the reverse mapping circuitry 72 applies an inverse hash operation 76 to the mapping information stored in the accessed mapping entry 40 (the line tag) and to at least a portion of the second identifier received from downstream, to reconstruct the first identifier (cache line identifier) to be provided upstream. If a set-associative policy is used for the first subset 60, then the inverse hash is applied to a sub-portion of the second identifier, while if a hash-associative policy is used for the first subset 60, then the inverse hash may be applied to the whole second identifier.

The following table shows examples of potential hash and inverse hash functions 74, 76 that could be used (in these examples J=256 and K=16):

| Hash operation | Example | Inverse hash operation | Example |
|---|---|---|---|
| extract least significant bits from $1^{st}$ ID | $1^{st}$ ID: 10110011 $2^{nd}$ ID: 0011 Line tag 1011 | append line tag to $2^{nd}$ ID | $2^{nd}$ ID 0011 Line tag 1011 $1^{st}$ ID: 10110011 |
| add constant and extract least significant bits (e.g. constant = 0011) | $1^{st}$ ID: 10110011 $2^{nd}$ ID: 0110 Line tag: 1011 | append line tag to $2^{nd}$ ID and subtract constant | $2^{nd}$ ID 0110 Line tag 1011 $1^{st}$ ID: 10110011 |
| extract bits 2-5 and XOR with constant 2-5 (e.g. constant 1001) | $1^{st}$ ID: 10110011 Extract bits 2-5: 1100 $2^{nd}$ ID: 0101 Line tag (remaining bits 7, 6, 1, 0): 1011 | XOR $2^{nd}$ ID with constant and insert between bits 1 and 2 of line tag | $2^{nd}$ ID: 0101 Line tag 1011 XOR $2^{nd}$ ID with constant: 1100 $1^{st}$ ID: 10110011 |
| XOR respective combinations of bits of the $1^{st}$ ID, e.g. hash bit [n] = XOR of $1^{st}$ ID bit [n] and $1^{st}$ ID bit [n + 4] | $1^{st}$ ID: 10110011 $2^{nd}$ ID: 1000 Line tag: 1011 (upper 4 bits of $1^{st}$ ID) | Append tag and the result of XOR of $2^{nd}$ ID and tag | $2^{nd}$ ID: 1000 Line tag: 1011 $1^{st}$ ID: 10110011 |

Clearly, these are just some possible examples of potential hash and inverse hash functions.

When a response is received from the downstream site, the reverse mapping circuitry 72 triggers the free bitmap 44 to clear the bit 42 which corresponds to the mapping entry 40 which was selected based on the received transaction ID, so as to make the corresponding mapping entry 40 available for allocation to another cache line identifier in a subsequent cycle. As shown in FIG. 4, a ready signal 80 is also provided back to the upstream component indicating whether the mapping circuitry is ready to accept another request. The ready signal may be formed as a logical OR combination of a free signal 82 indicating whether there is at least one free entry in the selected group of entries in the first subset 60 of mapping entries (the selected group is identified based on the hashing of the most recently received first identifier), and an OR reduction of all of the available bits 42 for the second subset of entries 62. Hence, if none of the mapping entries 40 is available, then the ready signal 80 is cleared and the upstream component will be stalled until an entry becomes available for reallocation that can accept the most recently received request.

Hence, with this approach the spill set of entries (second subset) 62 ensures that most of the second identifiers can be used in parallel in practice, because as many aliasing conflicts as there are mapping entries 40 in the second subset 62 are needed before a stall is required. This means that the scheme provides as high performance as the fully dynamic allocation shown in FIG. 2, but with much lower area because for many of the mapping entries 40 only a small line tag needs to be stored rather than the full cache line identifier. As an example, if a cache 32 has 512 cache lines and these need to be mapped to one of 256 transaction identifiers (i.e. J equals 512 and K equals 256), then with the approach shown in FIG. 2, 10 bits of storage would be needed for each of the 256 mapping entries (9 index bits to specify the cache line identifier and 1 available bit 42 per mapping entry). Hence, using the approach shown in FIG. 2 with J equals 512 and K equals 256 would require a total of 2560 bits of storage in the mapping circuitry. In contrast, an example using the approach of FIG. 4 could map 512 cache line identifiers to 272 transaction identifiers (256 entries in the first subset and 16 entries in the second subset 62) with just 672 bits of storage, since each of the 256 entries in the first subset need only specify a 1-bit tag and 1 bit for the available bit 42, while for the second subset this would still require 10 bits of storage per entry as in the map of FIG. 2, giving a total of 672 bits. Hence this approach can greatly reduce the amount of storage required for mapping a given number of first identifiers. The benefits of this approach increase as the number of second identifiers increases.

FIG. 4 describes a basic implementation of this mapping scheme, but some other variations can be provided. For example, the above description describes applying a single hash function 74 to the cache line identifier to select one particular mapping entry 40 of the first subset 60. However in other examples as shown by the dotted lines in FIG. 4, the allocation circuitry 70 may apply two or more different hash functions to the received cache line identifier to select a group of mapping entries of the first subset 60, and if any of those group of entries are available then the cache line identifier can be allocated to the available entry of the selected group. For different cache line identifiers the hashes 74 may identify a different group of entries of the first subset 60. Hence by checking multiple entries' availability for each received cache line identifier and picking the available entry from that group, this reduces conflicts considerably and so allows usage of a smaller spill buffer (i.e. fewer entries in the second subset 62 to provide a given level of performance). With this approach, in addition to the line tag, the mapping information specified in a given mapping entry 40 of the first subset 60 can also identify which of the alternative hash functions 74 was used to map the received cache line identifier onto that mapping entry, so that on receiving a response from downstream the corresponding one of a number of inverse hash functions 76 as shown in dotted lines in FIG. 4 can be selected. For example if 4 hash functions are provided then the line tags may include an additional two bits to indicate which hash function was used. The alternative hash functions could use different hash operations as shown in the table above, or could use the same hash operation but applied using different hash constants or applied to a different group of bits of the identifier.

In another variation, rather than checking the first subset of entries 60 for all of the received cache line identifiers, some particular cache line identifiers may always be mapped onto the second subset of entries 62. This can be particularly useful if the number of transaction identifiers is such that it is not friendly for generating a good hash function. For instance, if there are 512 cache lines (J=512) and 254 transaction identifiers allocated for use by the cache 32 (K=254), a hash function which hashes 512 cache lines to 256 transaction identifiers (so that only one bit per line tag is needed) may be more friendly than a hash function which maps directly to 254 transaction identifiers. If a relatively small spill set (second subset) of 30 entries is used, this leaves 224 mapping entries in the $1^{st}$ subset, which could correspond to transaction identifiers 0 to 223. In this case, the 512 cache lines may still be mapped using a hash function to hash values 0 to 255, but any cache lines which map to hash values 224 to 255 may be mapped directly to the second subset 62 of entries in the spill buffer, instead of attempting to look up availability in the first subset 60 of mapping entries.

Hence, in some cases for a first group of the cache line identifiers (e.g. cache lines whose hashed values fall in the range 0 to 223 in the example above) the allocation circuitry 70 may check availability of the selected group of entries 40 in the first subset 60 as discussed above and if none of these is available then an available entry in the second subset 62 may be used, but for a remaining group of first identifiers this checking of availability in the first subset 60 may be omitted and instead the identifier may simply be allocated to any available entry 40 in the second subset 62.

Figure 5:
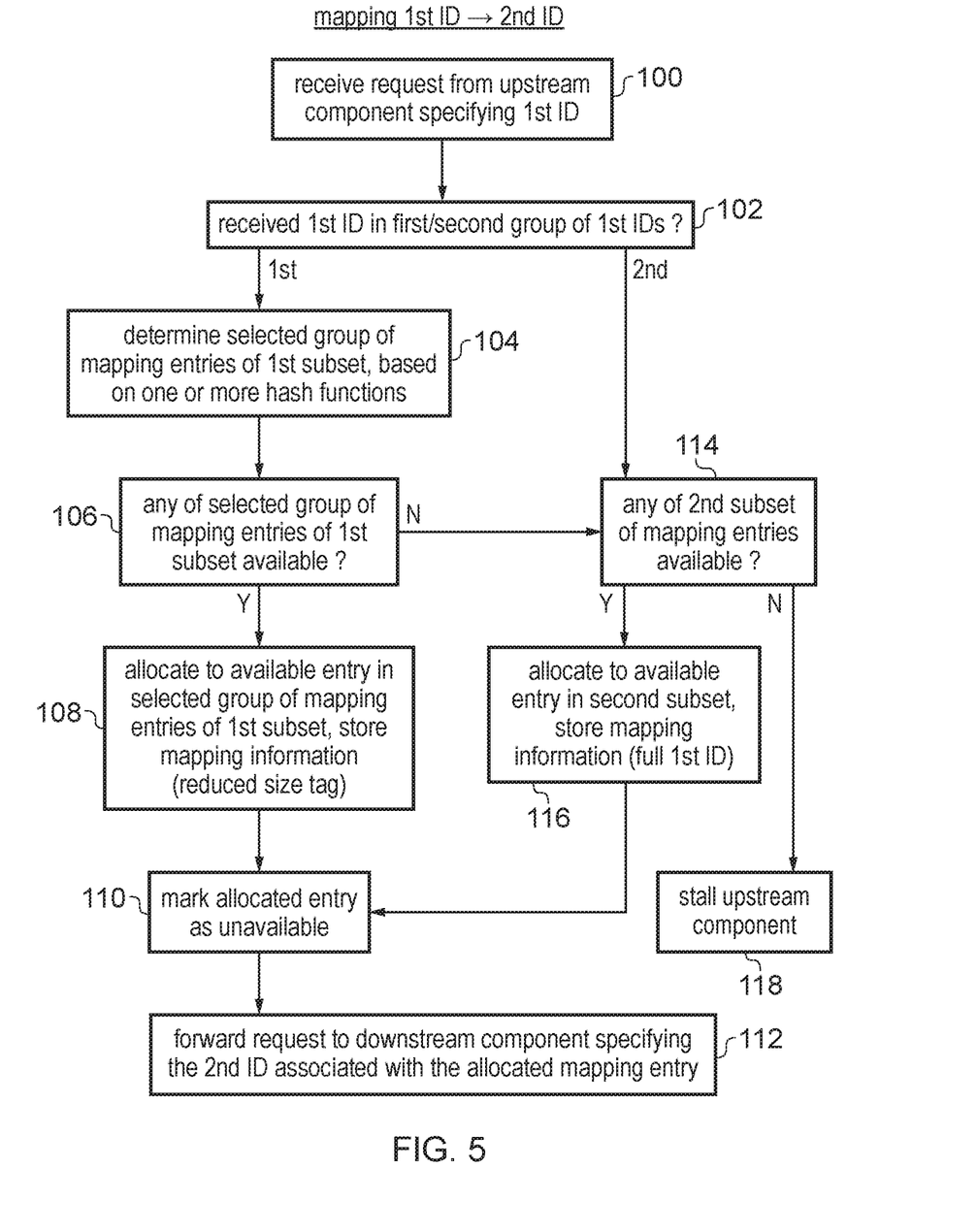
FIG. 5 shows a flow diagram illustrating a method of mapping a first identifier to a second identifier using the mapping circuitry.

FIG. 5 shows a flow diagram showing an example of mapping a first identifier to a second identifier using the mapping circuitry 30. At step 100 a request is received from an upstream component of the data processing system specifying a particular first identifier. At step 102 the allocation circuitry 70 checks whether the received first identifier is in the first group of first identifiers which could be allocated to either the first or second subset 60, 62 of mapping entries or is in the second group (remaining group) of first identifiers which is allocated directly to the second subset 62. Note, that in some embodiments the determination of whether the received first identifier is in the first or second group could be determined after applying the hash function at step 104 (based on the hashed value), rather than before step 104 as in the example of FIG. 5.

If the received first identifier is in the first group, then at step 104 the allocation circuitry 70 determines a selected group of one or more mapping entries of the first subset 60, based on one or more hash functions 74 applied to the received first identifier. At step 106 the allocation circuitry 70 determines based on the available bitmap 44 whether any of the selected group of mapping entries is currently available. If so, then at step 108 the received first identifier is allocated to an available entry in the selected group. If multiple mapping entries 40 in the selected group are available then the allocation circuitry 70 could simply select the first available entry (there is no need to incur additional circuit area overhead in implementing more complex allocation policies such as round robin or least recently used). The allocation circuitry 70 stores mapping information in the allocated mapping entry of the first subset. The mapping information comprises a reduced size tag which distinguishes the received first identifier from other first identifiers which would alias onto the same mapping entry 40. If multiple hash functions were applied at step 104 then the mapping information may also specify which particular hash was used to map the received first identifier to the index of the allocated mapping entry 40. At step 110 the allocation circuitry 70 updates the available bitmap 44 to mark the entry allocated for the received first identifier as unavailable, and at step 112 the request is forwarded to the downstream component of the data processing system specifying the second identifier which is associated with the allocated mapping entry 40. For example if the first mapping entry 40 is used then this can be mapped to a second identifier value of 0, the next mapping entry could be associated with a second identifier value of 1 and so on.

If at step 106 the allocation circuitry 70 determines that none of the selected group of mapping entries in the first subset 60 are available, then at step 114 the allocation circuitry 70 determines whether any of the second subset 62 of mapping entries are available, again based on the available bitmap 44. If one of the second subset of entries is available, then at step 116 the allocation circuitry 70 allocates the received first identifier to any available entry 42 in the second subset 62, and stores mapping information to the allocated entry in the second subset, with the mapping information specifying the full first identifier which was received from the upstream component. The method then proceeds to step 110 to mark the allocated entry as unavailable in the same way as following step 108, and again the request is forwarded downstream specifying the second identifier associated with the allocated mapping entry which was selected at step 116.

If at step 114 it is determined that none of the second subset of mapping entries is available, then the method proceeds to step 118 where the ready signal is cleared to stall the upstream component, so that the upstream component will delay issuing further requests until a mapping entry becomes available.

If at step 102 the received first identifier is determined to be in the second group of first identifiers, then the method proceeds to step 114 to consider availability of mapping entries 40 in the second subset 62 (skipping step 106). Following step 114, the subsequent steps are the same as if the first identifier had been in the first group of first identifiers but none of the selected group of mapping entries was available at step 106.

Figure 6:
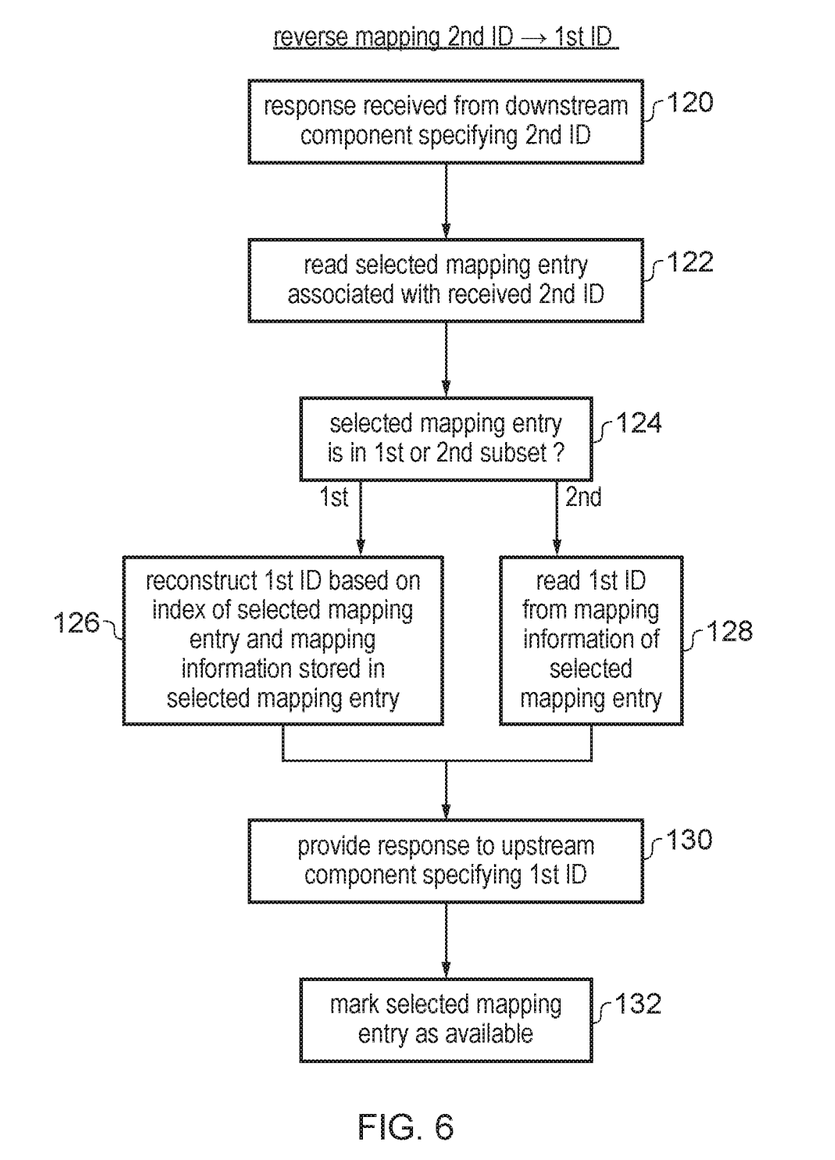
FIG. 6 is a flow diagram illustrating a method of reverse mapping a second identifier to a first identifier.

FIG. 6 is a flow diagram showing a method of performing the reverse mapping from a second identifier received from a downstream component to a first identifier to be written to the upstream components. At step 120 the reverse mapping circuitry 72 receives the second identifier from the downstream component. At step 122 the reverse mapping circuitry 72 selects one particular mapping entry 40 from either the first or second subset 60, 62 that is associated with the received second identifier, and reads the mapping information from that selected mapping entry. At step 124 it is determined whether the selected entry was in the first subset 60 or the second subset 62. If the selected mapping entry is in the first subset then at step 126 the reverse mapping circuitry 72 reconstructs the corresponding first identifier based on the received second identifier and the mapping information (e.g. line tag, and optionally hash function identifier) stored in the selected mapping entry. For example the first identifier may be reconstructed in the way shown in the table above. If the selected mapping entry was in the second subset then instead at step 128 the corresponding first identifier is simply read from the mapping information of the selected mapping entry in the second subset 62.

Regardless of whether the mapping entry was in the first or second subset, at step 130 a response is provided to the upstream component of the data processing system specifying the first identifier obtained at one of steps 126, 128. At step 132 the reverse mapping circuitry 72 triggers the available bitmap 44 to clear the available indication for the mapping entry selected at step 122 to mark this entry as available for reallocation to a different first identifier.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A data processing system comprising:
mapping circuitry to map a received first identifier received from an upstream component of the data processing system to a corresponding second identifier to be provided to a downstream component of the data processing system, where the received first identifier is one of a set of J first identifiers and the corresponding second identifier is one of a set of K second identifiers, where K<J;
the mapping circuitry comprising:
storage circuitry to store K mapping entries each associated with a respective second identifier of the set of K second identifiers, and each configured to store mapping information for identifying which first identifier is mapped to the associated second identifier; and
allocation circuitry to control allocation of first identifiers to the respective mapping entries of the mapping circuitry; in which:
for a first subset of mapping entries associated with a first subset of the K second identifiers, the allocation circuitry is configured to prevent allocation of a given first identifier to a mapping entry of the first subset other than a selected group of mapping entries comprising one or more mapping entries of the first subset selected based on the given first identifier; and
for a second subset of mapping entries associated with a second subset of the K second identifiers, the allocation circuitry is configured to permit the given first identifier to be allocated to any mapping entry in the second subset, and in which
when the received first identifier is one of a first group of first identifiers, the allocation circuitry is configured to:
allocate the received first identifier to one of the selected group of mapping entries of the first subset selected based on the received first identifier, when one of the selected group of mapping entries is available; and
allocate the received first identifier to one of the second subset of mapping entries, when none of the selected group of mapping entries of the first subset are available.

2. The data processing system according to claim 1, in which the first group of first identifiers comprises all J first identifiers.

3. The data processing system according to claim 1, in which the first group of first identifiers comprises fewer than J first identifiers; and
when the received first identifier is one of a remaining group of first identifiers, the allocation circuitry is configured to allocate the received first identifier to one of the second subset of mapping entries.

4. The data processing system according to claim 1, in which when the received first identifier is one of the first group of identifiers, none of the selected group of mapping entries are available, and none of the second subset of mapping entries are available, the allocation circuitry is configured to trigger stalling of the upstream component.

5. The data processing system according to claim 1, in which for a mapping entry of the second subset, the mapping information specifies the entire value of the first identifier which is mapped to the associated second identifier.

6. The data processing system according to claim 1, in which for a mapping entry of the first subset, the mapping information specifies a tag value with fewer bits than the first identifier which is mapped to the associated second identifier;
the tag value of a given mapping entry of the first subset providing information for distinguishing the first identifier which is mapped to the associated second identifier from other first identifiers which are allowed to be allocated to the given mapping entry of the first subset by the allocation circuitry.

7. The data processing system according to claim 1, in which the selected group of mapping entries of the first subset comprises a single mapping entry of the first subset selected based on a hash function of the given first identifier.

8. The data processing system according to claim 1, in which the selected group of mapping entries of the first subset comprises two or more mapping entries of the first subset.

9. The data processing system according to claim 8, in which each of the two or more mapping entries is selected based on a respective hash function of the given first identifier.

10. The data processing system according to claim 9, in which the mapping information for a given mapping entry of the first subset specifies information indicative of which of a plurality of hash functions was used to allocate the associated first identifier to the given mapping entry.

11. The data processing system according to claim 1, comprising reverse mapping circuitry to map a received second identifier received from the downstream component to a corresponding first identifier to be provided to the upstream component, based on the mapping information stored in a selected mapping entry of the first subset or the second subset, the selected mapping entry being selected based on the received second identifier.

12. The data processing system according to claim 11, in which following receipt of the received second identifier from the downstream component, the mapping circuitry is configured to make the selected mapping entry available for reallocation to a different first identifier.

13. The data processing system according to claim 1, in which the upstream component comprises a cache, and the downstream component comprises a memory system component.

14. The data processing system according to claim 13, in which the received first identifier comprises a cache line identifier identifying a cache line of the cache, and the corresponding second identifier comprises a memory transaction identifier associated with a memory transaction to be issued to the memory system component.

15. The data processing system according to claim 1, in which the upstream component comprises a master device, and the downstream component comprises a slave device.

16. The data processing system according to claim 15, in which the master device is configured to issue requests to a plurality of respective slave devices,
   each slave device comprises a respective instance of the mapping circuitry to map the received first identifier specified by the master device to the corresponding second identifier used by the slave device.

17. The data processing system according to claim 1, in which the downstream component comprises texture mapping circuitry of graphics processing circuitry, the received first identifier comprises a message identifier issued by an upstream component of the graphics processing circuitry to trigger the texture mapping circuitry to perform texture mapping on a corresponding graphics fragment, and the corresponding second identifier comprises a fragment identifier used by the texture mapping circuitry to identify the corresponding graphics fragment.

18. A method for mapping, using mapping circuitry, a received first identifier received from an upstream component of a data processing system to a corresponding second identifier to be provided to a downstream component of the data processing system, where the received first identifier is one of a set of J first identifiers and the corresponding second identifier is one of a set of K second identifiers, where K<J, the method comprising:
   in response to the received first identifier, allocation circuitry allocating the received first identifier to one of K mapping entries stored in storage circuitry, each mapping entry being associated with a respective second identifier of the set of K second identifiers, each mapping entry storing mapping information for identifying which first identifier is mapped to the associated second identifier, in which:
   the allocation circuitry controls allocation of first identifiers to the respective mapping entries such that:
     for a first subset of mapping entries associated with a first subset of the K second identifiers, a given first identifier is prevented from being allocated to a mapping entry of the first subset other than a selected group of mapping entries comprising one or more mapping entries of the first subset selected based on the given first identifier; and
     for a second subset of mapping entries associated with a second subset of the K second identifiers, the given first identifier is permitted to be allocated to any mapping entry in the second subset, and in which when the received first identifier is one of a first group of first identifiers, the allocation circuitry controls allocation of first identifiers to the respective mapping entries such that:
     when one of the selected group of mapping entries is available, the allocation circuitry allocates the received first identifier to one of the selected group of mapping entries of the first subset selected based on the received first identifier; and
     when none of the selected group of mapping entries of the first subset is available, the allocation circuitry allocates the received first identifier to one of the second subset of mapping entries.

19. A data processing system comprising:
mapping circuitry to map a received first identifier received from an upstream component of the data processing system to a corresponding second identifier to be provided to a downstream component of the data processing system, where the received first identifier is one of a set of J first identifiers and the corresponding second identifier is one of a set of K second identifiers, where K<J;
the mapping circuitry comprising:
   storage circuitry to store K mapping entries each associated with a respective second identifier of the set of K second identifiers, and each configured to store mapping information for identifying which first identifier is mapped to the associated second identifier; and
   allocation circuitry to control allocation of first identifiers to the respective mapping entries of the mapping circuitry; in which:
for a first subset of mapping entries associated with a first subset of the K second identifiers, the allocation circuitry is configured to prevent allocation of a given first identifier to a mapping entry of the first subset other than a selected group of mapping entries comprising one or more mapping entries of the first subset selected based on the given first identifier; and
for a second subset of mapping entries associated with a second subset of the K second identifiers, the allocation circuitry is configured to permit the given first identifier to be allocated to any mapping entry in the second subset,
for a mapping entry of the first subset, the mapping information specifies a tag value with fewer bits than the first identifier which is mapped to the associated second identifier; and
the tag value of a given mapping entry of the first subset providing information for distinguishing the first identifier which is mapped to the associated second identifier from other first identifiers which are allowed to be allocated to the given mapping entry of the first subset by the allocation circuitry.

* * * * *